United States Patent [19]
Krieg

[11] Patent Number: 5,205,412
[45] Date of Patent: Apr. 27, 1993

[54] RECYCLABLE PACKAGE FOR A STACK OF ROLLS OF MAGNETIC TAPE

[75] Inventor: Alejandro V. Krieg, Mexico City, Mexico

[73] Assignee: Aurex, S.A. DE C.V., Mexico City, Mexico

[21] Appl. No.: 866,026

[22] Filed: Apr. 8, 1992

[51] Int. Cl.$^5$ .......................................... B65D 85/672
[52] U.S. Cl. ................................ 206/394; 206/397; 206/403; 229/23 BT; 229/164
[58] Field of Search ............. 206/389, 341, 394, 395, 206/397, 403, 413–416, 408, 303; 229/23 BT, 125.29, 164, 401; 220/4.24

[56] References Cited

U.S. PATENT DOCUMENTS

| | | | |
|---|---|---|---|
| 1,357,519 | 11/1920 | Russell | 229/164 X |
| 1,397,954 | 11/1921 | Gager, Jr. | 206/408 X |
| 2,129,198 | 9/1938 | Crouch et al. | 206/395 |
| 2,160,235 | 5/1939 | Slusar | 206/394 X |
| 2,435,355 | 2/1948 | Ingran, Sr. | 229/23 BT |
| 3,738,563 | 6/1973 | Eifrid | 229/23 BT |
| 3,901,432 | 8/1975 | Lancaster | 229/23 BT X |
| 4,122,949 | 10/1978 | Blatt | 206/303 |
| 4,362,265 | 12/1982 | Williams | 229/901 X |
| 4,667,824 | 5/1987 | Ditchfield | 206/408 |

FOREIGN PATENT DOCUMENTS 2444617  8/1980  France ............................ 229/23 BT Primary Examiner—Bryon P. Gehman
Attorney, Agent, or Firm—Flehr, Hohbach, Test, Albriton & Herbert

[57] ABSTRACT

A recyclable package for a stack of rolls of magnetic tape is described. The package is provided by two main packaging components that are made of paperboard. Each of these components can be formed from a single blank of material. Moreover, a central hollow hub is provided that not only aids in holding the components together, but rigidly positions a stack of magnetic tape rolls in the package.

6 Claims, 4 Drawing Sheets

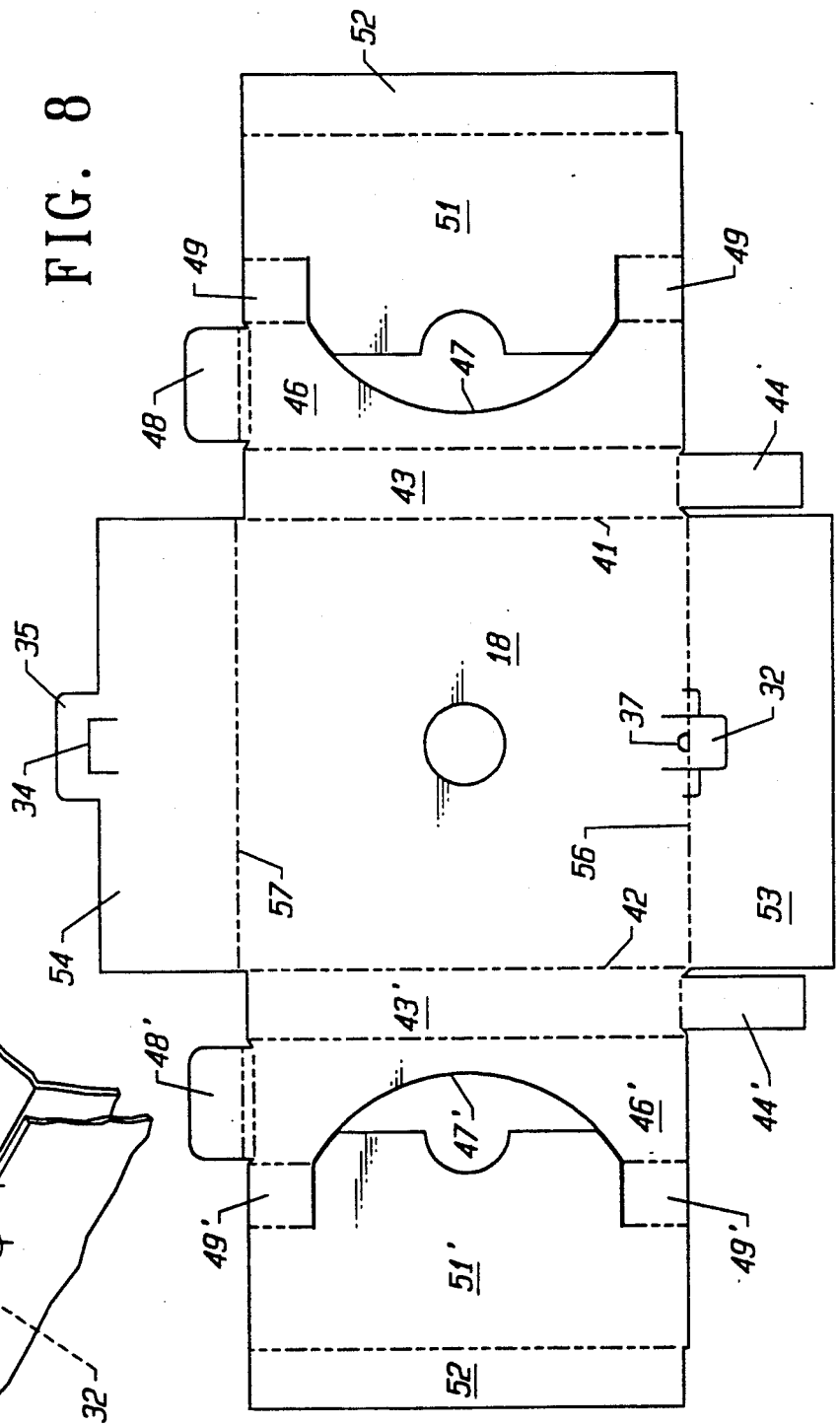

RECYCLABLE PACKAGE FOR A STACK OF ROLLS OF MAGNETIC TAPE

BACKGROUND OF THE INVENTION

This invention relates to the packaging for transportation, storage and handling, of a plurality of rolls of magnetic tape and, more particularly, to a recyclable package for a stack of tape rolls which is essentially made of a biodegradable and reusable material.

Magnetic tape is used for magnetically storing audio, video or other information. Audio and video tape now typically is loaded into cassettes for the same after the cassettes are otherwise assembled. This tape may be blank or prerecorded with data defining the desired information. Tape suppliers provide the tape, in the form of tape rolls from which tape can be unwound, both to cassette manufacturers and to "duplicators" who record desired data on the same. Such tape rolls are shipped and/or stored in packaged stacks. In the past, the most widely used packages for such stacks have been neither reusable nor biodegradable. That is, prior art containers typically are of Styrofoam (a term which is becoming generic for expanded, cellular polystyrene). It is not biodegradable and the containers made of the same are too flimsy for reuse. While in theory a Styrofoam package is sometimes reusable, as a practical matter almost all Styrofoam packages end up in land-fills, taking up space.

SUMMARY OF THE INVENTION

The present invention provides a recyclable package for a plurality of rolls of magnetic tape. The major components of the same are made of a paperboard. In addition to being a relatively inexpensive material, paperboard is biodegradable and reusable. However, paperboard is a material that is not resistant to many forces. For example, cardboard is incapable of resisting significant bending loading. Thus, one major feature of the invention is that it has a construction which has the rigidity necessary to protect a stack of tape rolls when such rolls are subjected to the normal forces which are expected during packaged transportation and handling. In this connection, each of the main packaging components includes constructions which impart rigidity to the same and to the remainder of the package.

The package also includes a cylindrical central hub having an exterior surface which accommodates the cylindrical surface formed by a stack of ring cores upon which magnetic tape is wound. Such hub acts as means for holding the packaging components together. There typically are two of the packaging components designed to enclose opposed ends of a stack, and the hub extends between the main panels of the pair. The invention also includes a blank for forming each of the desired packaging components. It has been found that with the packaging construction, the necessary rigid construction can be achieved even though the two major components of the same are formed as single blanks.

Other features and advantages of the invention either will become apparent or will be described in connection with the following, more detailed description of a preferred embodiment of the invention.

BRIEF DESCRIPTION OF THE DRAWING

With reference to the accompanying 4 sheets drawings:

FIG. 7 is an enlarged broken away isometric view of the construction by which adjacent main components of the assembly are secured to one other; and.

FIG. 8 is an elevation view of a blank of the invention for forming a recyclable packaging component of a package assembly.

DESCRIPTION OF THE PREFERRED EMBODIMENT(S)

The following relatively detailed description is provided to satisfy the patent statutes. However, it will be appreciated by those skilled in the art that various changes and modifications can be made without departing from the invention. The following description is exemplary, rather than exhaustive.

Figure 2:
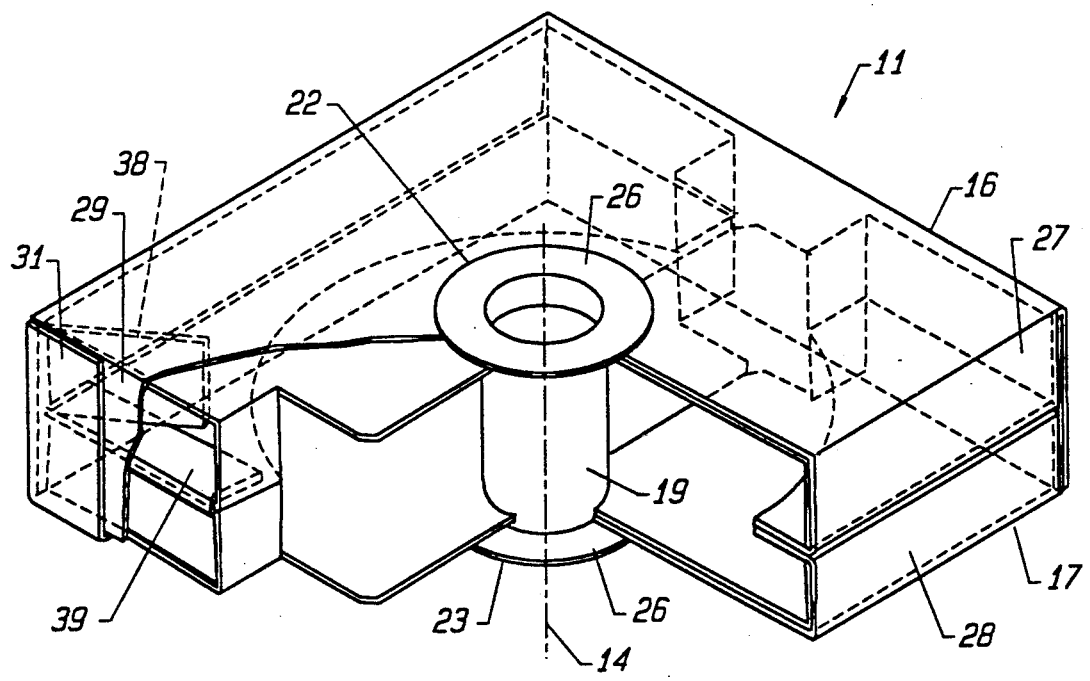
FIG. 2 is a broken away isometric view similar to that of FIG. 1 illustrating the interior construction of the package.
Figure 3:
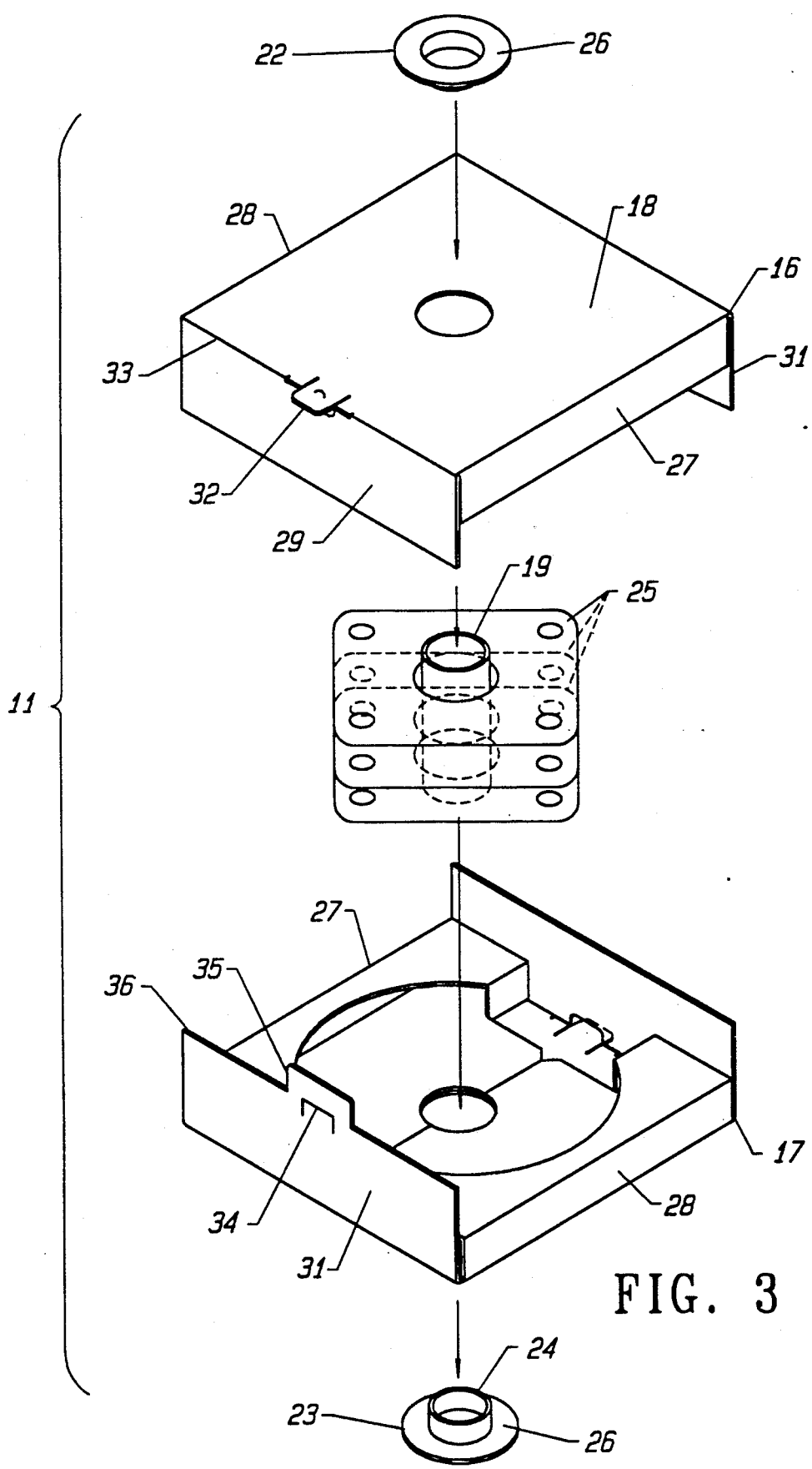
FIG. 3 is an isometric and exploded view of the embodiment of FIG. 1, showing the main packaging components and other parts of the package assembly.
Figures 4, 6:
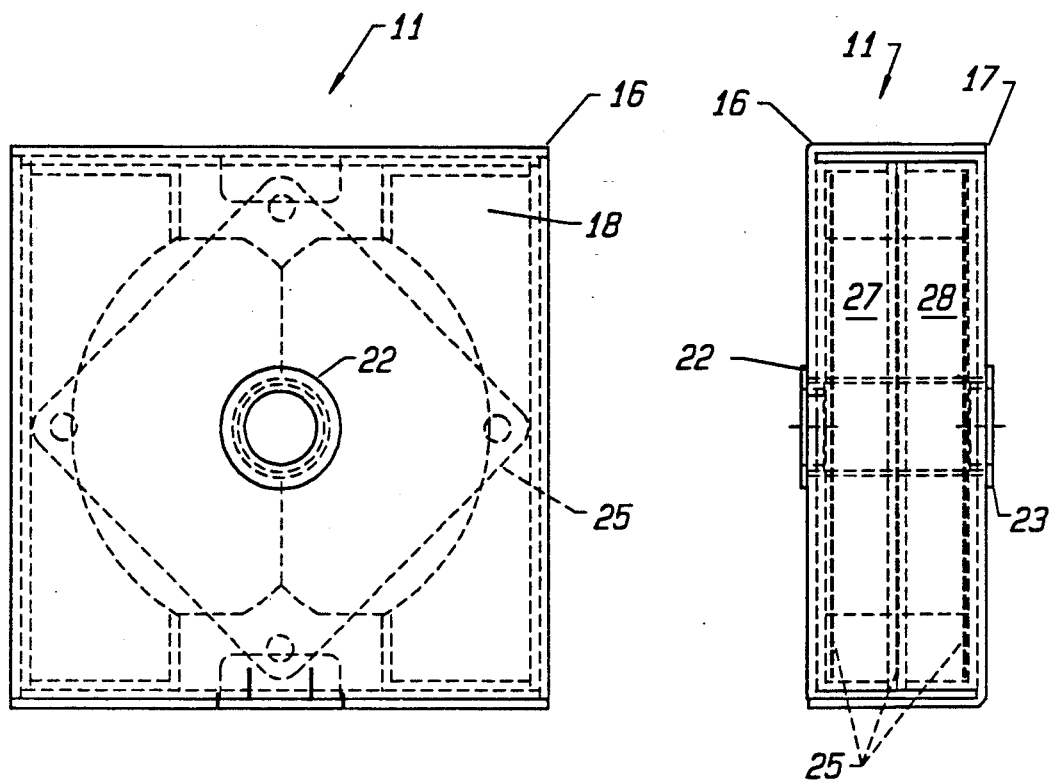
FIG. 4 is an elevation view of the package of FIG. 1 showing various hidden constructions of the same in phantom.
FIG. 6 is an end elevation view of such embodiment.
Figure 5:
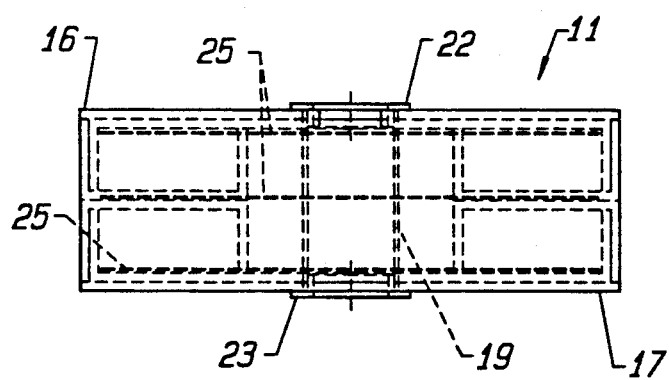
FIG. 5 is side elevation view of such embodiment.

A recyclable package of the invention is generally referred to in the figures by the reference numeral 11. Package 11 is designed to provide packaging for a stack 12 of rolls of magnetic tape during transportation, handling, and/or storage of the same. Each of the rolls includes a winding core 13 with adjacent ones of such cores in alignment along a central longitudinal axis 14 (see FIG. 2). (It should be noted that the showing of the winding cores is schematic—such cores include relatively complicated structures to assure locking together of adjacent cores at the right relative elevations.) The stack 12 of tape rolls is generally cylindrical with planar ends.

Figure 1:
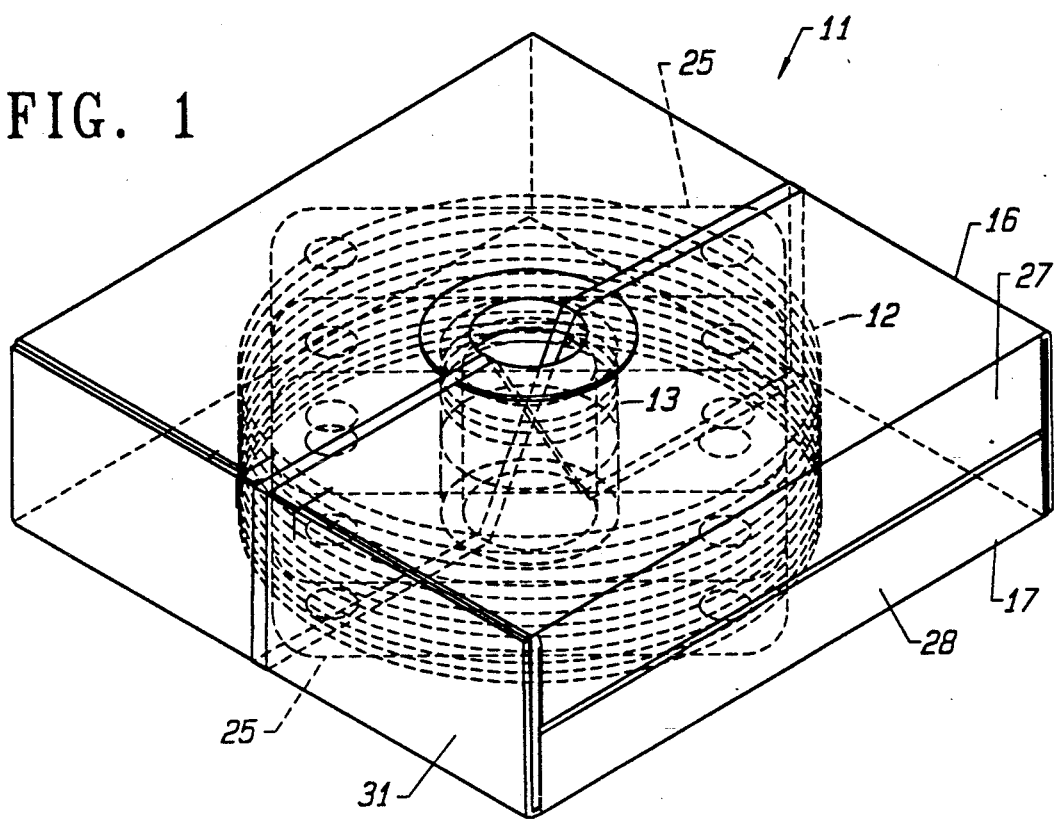
FIG. 1 is an isometric view of a recyclable package of a preferred embodiment of the invention, illustrating it enclosing a stack of magnetic tape rolls shown in phantom.

The tape itself and the rolls of the same are delicate, and it is important that the tape and rolls not be destroyed during transportation. The package of the invention is designed to provide the protection needed for the magnetic tape and yet be recyclable. To this end, package 11 is primarily made up of a pair of main package components 16 and 17, each of which is of paperboard and is configured from a single paperboard blank. The main panel 18 of each of the packaging components is designed to cover the planar side of one end of the stack as is illustrated. These two packaging components mate with one another to enclose the entire stack 12. A central hollow hub 19 is included, which hub has a dual function. It is cylindrical and extends through the central hole which is defined by the tape roll stack; its exterior cylindrical surface engages the interior cylindrical surface defined by the stack of winding cores 13. One of its functions is to hold the tape rolls rigidly in position within the package. For the other it acts as part of means for holding the packaging components 16 and 17 together. A strapping band 21 is provided extending through the hub from one side of the final package to the other. It can be seen from FIG. 1, for example, that such band cooperates with the hub to hold the two components together. Three plastic separators 25 are provided, one for each end of the stack of tapes in the package of the invention, and one for the middle position. Each of these separators is a relatively thin and flexible sheet to facilitate separation of the full stack into manageable portions by an unloader.

The two ends of the hub and the packaging adjacent thereto are protected by spacer flanges, 22 and 23, respectively, from the crushing force provided by the strapping band. The spacers are made of injection blow molded polypropylene, and each include a central cylindrical projection 24 press fit from the exterior of the packaging component into the interior of its associated cylindrical hub end to be held in position by a friction fit. Each spacer also includes a flaring disk-shaped flange 26 which engages the panel 18 adjacent the hole and holds it along with the rest of the component to the end of the hub 19. Besides helping to hold the packaging components together, this construction provides protection for the paperboard (panel 18 and the hub end) at a location at which the tape provides a crushing force. It will be noted that the spacers 22 and 23 are themselves not biodegradable. They are additional components of the package which can be recycled in the sense of being reused or by being returned to their native material for reuse of the same.

Opposed ends 27 and 28 of each of the packaging components are constructed to impart rigidity thereat to the ultimate package. That is, as is illustrated, each includes a generally box construction which is cut out to the extent necessary to accommodate the stack of rolls and to facilitate the construction of the full arrangement from a single blank. The opposed ends 29 and 31 are flaps 29 and 31 which overlap with corresponding flaps of the other packaging component when the full package is assembled. This results in a double thickness of the paperboard at such ends to impart rigidity thereat to the package.

Each of the packaging components also includes means for securing the same to an adjacent component when the components are assembled together properly to form a package. In this preferred embodiment such means takes the form of a tab 32 projecting from the panel 18 adjacent the linear edge 33 of the same from which the flap 29 depends. A slot 34 sized to receive the tab is provided by a paperboard construction 35 projecting from the free edge 36 of the flap 31 of the adjacent component. As can be seen from FIG. 7, when the components are assembled together, the tab 32 and the construction 35 are bent forward and respectively hidden beneath the panel 18 of the adjacent component. A cut out 37 for a finger is provided in the tab 32 to facilitate separation of such tab from slot 34. Interlocking tabs 38 and 39 are also provided to lock adjacent components together when they are assembled together to form the package. (Although the opposite side of the package includes comparable locking flaps, they ar illustrated only on one side for simplicity's sake.)

As mentioned previously, each of the components is made from a single blank. FIG. 8 illustrates such blank in elevation. To facilitate understanding, fold lines are indicated by double dot, dash lines. It includes at the center, a rectangular section providing the main panel 18. A plurality of sections are provided at each of the opposed fold lines 41 and 42 providing the linear edges of the rectangular panel, which sections provide constructions which impart rigidity to that portion of the same designed to accommodate the stack side and are sized to accommodate a curved side of the roll stack. The construction ext ending from the linear edge 41 includes a rectilinear part 43 which has a depth equal to the depth desired for the component as it extends along the side of the tape stack adjacent the end to be covered by the component. A flap 44 extends from the part 43 to act as a locking tab 38 when the blank is folded and the final package is assembled. Another part 46 projects from part 43. This second part has a curvilinear cutout as indicated at 47 to accommodate the curved stack. A flap 48 also projects sideways from the same to provide the locking tab 39. It is to be noted that flap 48 is connected to part 46 with two parallel fold lines to facilitate the bending required for interlocking with a flap 44 of an adjacent package. The part 46 terminates in a pair of parts 49 which have a width the same as the width of section 43 and provide a cut-out end wall facing the wall 43 when the construction is folded. A part 51 is secured via fold lines to the parts 49, which part when the construction is folded acts as a reinforcement panel adjacent the panel 18. This reinforces the planar top and bottom of the completed package assembly to provide additional protection for any tape roll stack that is packaged. The end piece terminates in a part 52 which when the blank is folded reinforces side panel 43.

It will be appreciated that although not described, the section parts projecting from linear edge 42 are the same as those described projecting from edge 41 and are referred to by the same reference numerals, primed. The sections 53 and 54, respectively, projecting from the linear edges 56 and 57 of the main panel 18 are flaps designed to overlap one another when the full package is assembled. As mentioned above, the provision of these overlapping flaps on both blanks making up a packaging assembly provides reinforcement at such sides.

As mentioned at the beginning of the detailed description, Applicant is not limited to the specific embodiment described above. Various changes and modifications can be made. The specific embodiment is exemplary, rather than exhaustive. The claims, their equivalents and their equivalent language define the scope of protection.

What is claimed is:

1. A recyclable package for a plurality of rolls of magnetic tape, comprising:
   (a) a plurality of packaging components made of a biodegradable or reusable material for enclosing said plurality of rolls of magnetic tape, wherein the magnetic tape of each roll is wound on a ring core, and said rolls are stacked; and
   (b) means for holding said components together in an assembly providing an enclosure of the stack of rolls, which means includes a hollow, generally cylindrical central hub having an exterior surface accommodating the cylindrical surface formed by the stacked ring cores, and which means further includes a band of packaging tape extending through said hub and a plurality of spacers on opposed ends of said hub, which spacers extend to the exterior of said assembly.

2. The recyclable package of claim 1 wherein said hub is paperboard.

3. The recyclable package of claim 1 further including additional components more resistant to crushing than paperboard positioned to interact with said band.

4. A recyclable package for a stack of rolls of magnetic tape, comprising:
   (a) a pair of packaging components made of paperboard for enclosing a stack of rolls of magnetic tape the magnetic tape being wound on a ring core in each roll; and
   (b) means for holding said pair of components together in mating relationship in an assembly providing an enclosure for said stack of rolls, which means includes a hollow, generally cylindrical central hub of paperboard having an exterior surface accommodating the cylindrical surface formed by the stack of ring cores, and which means further includes a strapping band extending through said hub.

5. The recyclable package of claim 4 further including additional components more resistant to crushing than paperboard positioned at opposed ends of said hub to interact with said band.

6. The recyclable package of claim 5 wherein said additional components are spacers positioned on opposed ends of said hub, which spacers extend to the exterior of said assembly.

* * * * *